United States Patent
Shastry et al.

(10) Patent No.: US 9,619,548 B2
(45) Date of Patent: Apr. 11, 2017

(54) DIMENSION WIDENING AGGREGATE DATA

(71) Applicant: Google Inc., Mountain View, CA (US)

(72) Inventors: Niranjan Heddese Sitaram Shastry, Mountain View, CA (US); Jieyan Fan, Mountain View, CA (US); Yuan Zhuge, Mountain View, CA (US); Sze Chit Ho, Mountain View, CA (US); Richard Maher, Mountain View, CA (US); Timothy John Wright, Mountain View, CA (US)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 14/282,739

(22) Filed: May 20, 2014

(65) Prior Publication Data

US 2015/0370852 A1 Dec. 24, 2015

(51) Int. Cl.
*G06F 17/30* (2006.01)

(52) U.S. Cl.
CPC .. *G06F 17/30592* (2013.01); *G06F 17/30292* (2013.01); *G06F 17/30297* (2013.01); *G06F 17/30424* (2013.01)

(58) Field of Classification Search
CPC ......... G06F 17/30598; G06F 17/30705; G06F 17/30554; G06F 17/30342; G06F 17/30961; G06F 17/30592; G06F 17/30292; G06F 17/30297; G06F 17/30424
USPC ........................................ 707/722, 792, 803
See application file for complete search history.

(56) References Cited

U.S. PATENT DOCUMENTS

| | | | | |
|---|---|---|---|---|
| 5,592,666 A | * | 1/1997 | Perez | G06F 17/30961 |
| 8,037,108 B1 | | 10/2011 | Chang | |
| 8,140,383 B2 | * | 3/2012 | Busch | G06F 17/30398 705/7.38 |
| 8,271,514 B2 | | 9/2012 | Geva | |
| 8,275,762 B2 | | 9/2012 | Gupta et al. | |
| 8,364,628 B2 | | 1/2013 | Kulkarni et al. | |
| 8,898,175 B2 | * | 11/2014 | Zenger | G06F 17/30445 707/748 |
| 8,954,454 B2 | * | 2/2015 | Brown | G06F 17/30864 707/755 |
| 9,208,453 B2 | * | 12/2015 | Sinha | G06Q 10/00 |
| 9,384,221 B2 | * | 7/2016 | Fan | G06F 17/30292 |
| 2008/0134048 A1 | * | 6/2008 | Leibow | G06Q 30/0603 715/738 |
| 2009/0157447 A1 | * | 6/2009 | Busch | G06F 17/30398 705/7.38 |
| 2010/0223244 A1 | * | 9/2010 | Sinha | G06Q 10/00 707/705 |

(Continued)

*Primary Examiner* — Jean M Corrielus
(74) *Attorney, Agent, or Firm* — Foley & Lardner LLP; John D. Lanza

(57) ABSTRACT

A request for aggregate data stored in an aggregates database is received from a client device. A key-to-value dimension widening rule that applies to an aggregated data element of the requested data is identified. The key-to-value dimension widening rule includes a value dimension. A quantity of data elements that combined to form the aggregated data element is determined. A widened value dimension for the aggregated data element is calculated using the determined quantity and the value dimension. The widened value dimension is reported to the client device in response to the request.

20 Claims, 3 Drawing Sheets

(56) References Cited

U.S. PATENT DOCUMENTS

| | | | |
|---|---|---|---|
| 2012/0066204 A1* | 3/2012 | Ball | G06F 17/30592 707/713 |
| 2013/0103658 A1 | 4/2013 | Travis | |
| 2014/0101091 A1* | 4/2014 | Brown | G06F 17/30342 707/602 |
| 2014/0108437 A1* | 4/2014 | Brown | G06F 17/30563 707/755 |
| 2014/0143248 A1* | 5/2014 | Gembalzyk | G06F 17/30554 707/737 |
| 2014/0236664 A1* | 8/2014 | Zenger | G06F 17/30445 705/7.27 |
| 2016/0034498 A1* | 2/2016 | Fan | G06F 17/30297 707/803 |
| 2016/0042013 A1* | 2/2016 | Fan | G06F 17/30592 707/792 |

* cited by examiner

DIMENSION WIDENING AGGREGATE DATA

BACKGROUND

Analytics systems allow a customer (e.g., a content provider) to monitor and assess various types of performance. For example, the customer may have a campaign in which content items are distributed for display on a resource (e.g., providing advertisements on a website). The analytics system may allow the customer to measure and assess performance of the distributed content items (e.g., by generating an analytical report). In this context, a "report" is defined as a combination of keys and values. Typically, a data element needs to include all of the keys and values associated with a report to be included in the report.

SUMMARY

As used in this document, dimension widening refers to a process by which one or more keys and/or values of a data element are created or changed based on existing keys of the data element and a predefined mapping schema. For example, a report may include the keys "product_code," "product_name," and the values "price" and "quantity." Using dimension widening, customers may pre-upload their product catalogue which defines a mapping schema from product_code to product_name, price, and quantity. For each raw data element, customers only need to set product_code, and the analytics system joins the two data sets (i.e., the customer's dimension widening data and the raw data) by automatically adding an appropriate product_name, price, and quantity to the raw data, based on the mapping schema.

Dimension widening may be used to save time and effort relating to detailing information. For example, when a user interacts with a content item, a data element indicating the "hit" may be sent to an analytics system indicating the interaction. Instead of tagging the hit with information relating to the interaction, the data element may be associated with a product code or other code. Dimension widening rules may then be applied to multiple data elements at a later time in order to provide sufficient information relating to the hit. Without dimension widening, content providers would have to tag all customized fields related to a hit.

One challenge with dimension widening is the scale of the process. With a large number of dimension widening rules (i.e., mapping rules and conditions) and data elements to process, it is non-trivial join large data sets without introducing significant latency in the reporting process.

It is also challenging to apply dimension widening to aggregated data. A key-to-value mapping provided by a dimension widening rule may not be applicable to aggregated data. The value specified in the key-to-value mapping may apply only to non-aggregated data elements. Existing solutions to this problem include retaining the non-aggregated data indefinitely so that key-to-value mappings can be applied to the non-aggregated data. Then, the widened data are aggregated in response to a user query to generate aggregate values for reporting. However, this approach involves storing more raw data (non-aggregated data are larger than aggregated data) and takes more time (e.g., aggregating the data in response to a query), thereby increasing storage requirements and reporting latency.

One implementation of the present disclosure is a method for applying dimension widening rules to aggregate data. The method includes receiving, at a processing circuit, a request from a client device for aggregate data stored in an aggregates database and identifying, by the processing circuit, a key-to-value dimension widening rule that applies to an aggregated data element of the requested data. The key-to-value dimension widening rule includes a value dimension. The method further includes determining, by the processing circuit, a quantity of data elements that combined to form the aggregated data element and calculating, by the processing circuit, a widened value dimension for the aggregated data element using the determined quantity and the value dimension. The method further includes reporting the widened value dimension to the client device in response to the request.

In some implementations, the key-to-value dimension widening rule includes a condition key. The method may include determining that the key-to-value dimension widening rule applies to the aggregated data element in response to a determination that the condition key matches a key of the aggregated data element.

In some implementations, the method includes modifying, by the processing circuit, the request for aggregate data using a dimension widening schema associated with the client device and extracting the aggregated data element from the aggregates database in response to a determination that the aggregated data element satisfies the modified request.

In some implementations, modifying the request for aggregate data includes using the dimension widening schema to identify a key-to-key dimension widening rule comprising a condition key and an action key and adding the condition key to a list of scan keys for the request for aggregate data in response to a determination that the list of scan keys includes the action key. In some implementations, modifying the request for aggregate data includes adding to the request a mapping from the condition key to the action key.

In some implementations, determining whether the aggregated data element satisfies the modified request includes identifying one or more scan keys of the modified request and determining whether a key of the aggregated data element matches one or more of the scan keys.

In some implementations, calculating the widened value dimension for the aggregated data element includes multiplying the non-aggregated value dimension by the determined quantity.

In some implementations, determining the quantity of non-aggregated data elements that combined to form the aggregated data element includes, adding a quantity value dimension to the non-aggregated data elements prior to aggregating the data and aggregating the quantity value dimension to calculate the quantity of non-aggregated data elements.

In some implementations, determining the quantity of non-aggregated data elements that combined to form the aggregated data element includes generating metadata including an indication of the quantity of non-aggregated data elements prior to aggregating the data and storing the generated metadata in conjunction with the aggregate data.

In some implementations, the method includes generating an analytical report using the widened value dimension and providing the analytical report to the client device.

Another implementation of the present disclosure is an analytics system including a processing circuit having a processor and memory. The memory stores executable instructions that, when executed by the processor, configure the processing circuit to receive a request from a client device for aggregate data stored in an aggregates database and identify a key-to-value dimension widening rule that applies to an aggregated data element of the requested data.

The key-to-value dimension widening rule includes a non-aggregated value dimension. The processing circuit is further configured to determine a quantity of non-aggregated data elements that combined to form the aggregated data element, calculate a widened value dimension for the aggregated data element using the determined quantity and the non-aggregated value dimension, and report the widened value dimension to the client device in response to the request.

In some implementations, the key-to-value dimension widening rule comprises a condition key. The processing circuit may be configured to determine that the key-to-value dimension widening rule applies to the aggregated data element in response to a determination that the condition key matches a key of the aggregated data element.

In some implementations, the processing circuit is configured to modify the request for aggregate data using a dimension widening schema associated with the client device and extract the aggregated data element from the aggregates database in response to a determination that the aggregated data element satisfies the modified request.

In some implementations, modifying the request for aggregate data includes using the dimension widening schema to identify a key-to-key dimension widening rule comprising a condition key and an action key and adding the condition key to a list of scan keys for the request for aggregate data in response to a determination that the list of scan keys includes the action key. In some implementations, modifying the request for aggregate data includes adding to the request a mapping from the condition key to the action key.

In some implementations, determining whether the aggregated data element satisfies the modified request includes identifying one or more scan keys of the modified request and determining whether a key of the aggregated data element matches one or more of the scan keys.

In some implementations, calculating the widened value dimension for the aggregated data element includes multiplying the non-aggregated value dimension by the determined quantity.

In some implementations, determining the quantity of non-aggregated data elements that combined to form the aggregated data element includes, adding a quantity value dimension to the non-aggregated data elements prior to aggregating the data and aggregating the quantity value dimension to calculate the quantity of non-aggregated data elements.

In some implementations, determining the quantity of non-aggregated data elements that combined to form the aggregated data element includes generating metadata including an indication of the quantity of non-aggregated data elements prior to aggregating the data and storing the generated metadata in conjunction with the aggregate data.

In some implementations, the processing circuit is configured to generate an analytical report using the widened value dimension and provide the analytical report to the client device Those skilled in the art will appreciate that the foregoing summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
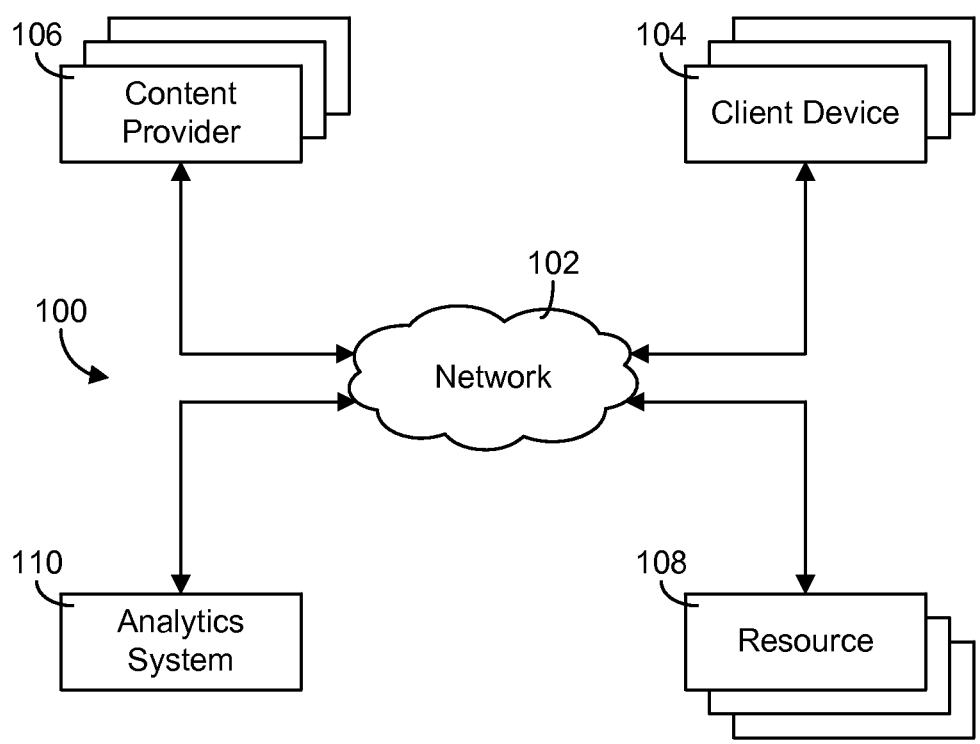
FIG. 1 is block diagram of a computer system including an analytics system configured to apply dimension widening rules to aggregated data, according to a described implementation.

Referring generally to the FIGURES, systems and methods for dimension widening aggregate data are shown, according to a described implementation. Dimension widening is a process by which one or more keys and/or values of a data element are created or modified based on existing keys of the data element and a predefined mapping schema. Using dimension widening, customers can define mappings from condition keys to action keys and action values.

In general, there are two kinds of mappings in dimension widening: key-to-key and key-to-value. Key-to-key mappings are straightforward to apply to aggregate data. For example, a data element may include the key "product_id" and the value "conversions." The product_id may be an alphanumeric code identifying a particular product (e.g., product_id=ABC123). The conversions value for the data element may be a metric representing a number of conversions associated with the data element (e.g., conversions=1). The data can be aggregated periodically such that the aggregated conversions metric represents the total number of conversions for all products with the given product_id key (e.g., conversions=n). If a customer defines a mapping from product_id to a new key such as product_name as part of a request for a report, dimension widening can be performed on the fly to produce a report from product_name to conversions by adding the product_name key to each data element with the given product_id key.

Mapping from key-to-value is more difficult. For example, a customer may define a mapping from the key "product_id" to the value "product_price," which is aggregated to calculate the metric "total_revenue." Each data element in a set of non-aggregated data can be mapped to the product_price value, but this granularity is lost when the data is aggregated. In other words, the product_price value cannot be directly applied to aggregate data because the product_price value applies only a single non-aggregated data element. The proper value to apply to the aggregate data is the result of aggregating multiple product_price values (i.e., the total_revenue metric) for all of the data elements that were aggregated to form the aggregate data. However, the total number of data elements that were aggregated to form the aggregate data may be unknown.

Existing solutions to this problem include retaining the non-aggregated data indefinitely so that key-to-value mappings can be applied to the non-aggregated data. Then, the widened data are aggregated in response to a user query to generate aggregate values for reporting. However, this approach involves storing more raw data (non-aggregated data are larger than aggregated data) and takes more time (e.g., aggregating the data in response to a query), thereby increasing storage requirements and reporting latency.

The systems and methods described herein may be used to apply dimension widening rules to aggregate data. Advantageously, the systems and methods of the present disclosure may be used to apply key-to-value mappings to aggregate data without requiring the non-aggregate data to be retained. This advantage allows the data to be aggregated prior to query time and stored in an aggregates database, thereby reducing both processing latency and data storage requirements.

In operation, an analytics system as described herein may retrieve the aggregate data from the aggregates database in response to a request from a client device, apply dimension widening rules to the aggregate data, and provide the dimension-widened data to the client device (e.g., in the form of a report). The analytics system may identify a key-to-value dimension widening rule that applies to an aggregated data element stored in the aggregates database and extract a non-aggregated value dimension from the key-to-value dimension widening rule.

The analytics system may determine a quantity of non-aggregated data elements that combined to form the aggregated data element. In some implementations, the analytics system adds a quantity value dimension to each non-aggregated data element prior to aggregating the data (e.g., quantity=1). Once the data are aggregated, the quantity dimension value may represent the quantity of non-aggregated data elements that combined to form the aggregated data element (e.g., quantity=n). In other implementations, the analytics system generates metadata indicating the quantity of non-aggregated data elements that are combined to form the aggregated data element upon aggregating the data and stores the generated metadata in conjunction with the aggregate data.

The analytics system may calculate a widened value dimension for the aggregated data element using the determined quantity (i.e., the quantity of non-aggregated data elements that combined to form the aggregated data element) and the non-aggregated value dimension extracted from the key-to-value dimension widening rule. In some implementations, the analytics system multiplies the determined quantity by the non-aggregated value dimension to calculate the widened dimension value. The widened dimension value may be reported to the client device in response to the request from the client device.

Referring now to FIG. 1, a block diagram of a computer system 100 is shown, according to a described implementation. Computer system 100 may be configured to perform metric widening on aggregate data and may facilitate the systems and methods of the present disclosure. Computer system 100 is shown to include a network 102, client devices 104, content providers 106, resources 108, and an analytics system 110.

Network 102 may be any form of computer network that relays information between client devices 104, content providers 106, resources 108, and analytics system 110. For example, network 102 may include the Internet and/or other types of data networks, such as a local area network (LAN), a wide area network (WAN), a cellular network, a satellite network, a radio network, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, analytics system 110 may communicate wirelessly (e.g., via WiFi, cellular, radio, etc.) with a transceiver that is hardwired (e.g., via a fiber optic cable, a CAT5 cable, etc.) to a computing device of network 102.

Network 102 may facilitate communication between client devices 104, content providers 106, resources 108, and analytics system 110. For example, analytics system 110 may receive a request for a report from client devices 104 and/or content providers 106 via network 102. Analytics system 110 may receive data from one or more of client devices 104, content providers 106, and resources 108 via network 102. In some implementations, analytics system 110 receives data relating to content items displayed on a client device 104 (e.g., content items received from a content provider 106) via network 102. Analytics system 110 may store the data in a data storage device, aggregate the data, apply dimension widening rules to the aggregated data, and/or generate a report in response to the request from client devices 104 or content providers 106.

Still referring to FIG. 1, computer system 100 is shown to include client devices 104. Client devices 104 may communicate with other computing devices via network 102. Client devices 104 may execute a web browser or other application (e.g., a video game, a messenger program, a media player, a social networking application, etc.) to retrieve content from other devices over network 102. For example, client devices 104 may communicate with any number of content providers 106 and resources 108. Content providers 106 and resources 108 may provide webpage data and/or other content, such as images, video, and audio, to client devices 104. One or both of content providers 106 and resources 108 may be configured to select third-party content to be provided to client devices 104. For example, a resource 108 may be configured to provide a first-party webpage to client device 104 that includes additional third-party content provided by a content provider 106.

Client devices 104 may include a variety of different types of electronic devices configured to communicate via network 102 (e.g., a laptop computer, a desktop computer, a tablet computer, a smartphone, a digital video recorder, a set-top box for a television, a video game console, combinations thereof, etc.). Client devices 104 may include mobile devices and/or non-mobile devices. Client devices 104 may include a user interface element (e.g., an electronic display, a speaker, a keyboard, a mouse, a microphone, a printer, etc.) for presenting content to a user, receiving user input, or facilitating user interaction.

Still referring to FIG. 1, computer system 100 is shown to include content providers 106. Content providers 106 may include one or more electronic devices representing advertisers, resource operators, business owners, or other entities. In some implementations, content providers 106 produce content items for presentation to client devices 104. In some implementations, the content items may be advertisements. The advertisements may be display advertisements such as image advertisements, animated advertisements, video advertisements, text-based advertisements, or any combination thereof. In other implementations, the content items may include other types of content which serve various non-advertising purposes. The content items may be displayed in a content slot of a resource 108 and presented (e.g., alongside other resource content) to client devices 104.

Content providers 106 may request and receive a report from analytics system 110 as generally described in the present disclosure. While the implementation shown in FIG. 1 describes analytics system 110 providing the report to content providers 106, it should be understood that the report may be provided to any user of a client device that requests the report. For example, a user associated with content provider 106 may request and receive the report. The client device of the user may generally include an application (e.g., web browser, resource renderer, etc.) for converting the report (or other electronic content) into a user-comprehensible format (e.g., visual, aural, graphical, etc.).

Still referring to FIG. 1, computer system 100 is shown to include resources 108. Resources 108 may include any type of information or data structure that can be provided over network 102. In some implementations, resources 108 may be identified by a resource address associated with each resource (e.g., a uniform resource locator (URL)). Resources 108 may include web pages, word processing documents, portable document format (PDF) documents, images, video, programming elements, interactive content, streaming video/audio sources, or other types of electronic information. Resources 108 may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by client devices 104 (e.g., by a web browser running on client devices 104).

One or more of content providers 106, resources 108, or a content selection service may be configured to select third-party content for a client device 104. In one implementation, the selected third-party content may be provided to client devices 104 through a content provider 106 via network 102. The third-party content may be presented in conjunction with first-party content from a resource 108. In other implementations, a content selection service may provide instructions to a client device 104 that causes the user device to retrieve the selected third-party content (e.g., from a memory of client device 104, from a content provider 106, etc.). Content may be selected based on a device identifier of the user device, in one implementation. A device identifier may generally refer to any form of data that may be used to represent a device or software that receives content to be presented. Content may further be selected based on history data of a client device 104 (e.g., data associated with an online event such as visiting a webpage, interacting with presented content, conducting a search, making a purchase, downloading content, etc.). Content may further be selected based on other activities, such as a content auction. For example, a real-time content auction may be conducted in response to a client device 104 requesting first-party content from a resource 108.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from a content server that may be more relevant to the user. In addition, certain data may be treated (e.g., by analytics system 110) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 104, etc.) and used by analytics system 110.

In some implementations, one or more of client devices 104, content providers 106, and resources 108 may report behavioral data including one or more metrics to analytics system 110. Behavioral data may include website traffic data, conversion data (e.g., conversion type, amount spent, etc.), click-through-path data (e.g., content impressions, clicks, or other interactions responsible for a conversion event), resource visit/download data, user account-related data, content item data (e.g., impressions, clicks, conversions, etc.), content selection data (e.g., content slot information, number/type of content requests, delivered content items, etc.), resource data, landing page data, or other types of data describing interactions between client devices 104, content providers 106, and resources 108.

Analytics system 110 may be generally configured to receive, aggregate, and process data. Analytics system 110 may generate a report to provide to content providers 106 or other users based on the data. Analytics system 110 may generate any type of report relating to the data. For example, analytics system 110 may receive data relating to the performance of content items such as advertisements on a webpage or other resource. The data may be aggregated and processed, and used to generate a report indicating the performance (e.g., revenue, number of views, etc.) of the advertisements. Content item performance may be measured based on, for example, a number of impressions of the content item, a number of clicks by a user, number of conversions, an amount spent associated with each conversion, etc., or based on other metrics describing the behavior of a user device (e.g., device usage information, software configuration, user profile information, geographic location, installed applications, etc.) consuming the content item. Analytics system 110 may be configured to format the report such that the user may interact with the report and such that the report is viewable on any type of user device.

While analytics system 110 is shown as a single entity or device in FIG. 1, it should be understood that the activities of analytics system 110 may be split between multiple devices. For example, any of the aggregation or processing steps performed by analytics system 110 may be performed on multiple devices (e.g., data may be received and processed by multiple devices, a reporting generation process may use processed data stored at different devices, etc.).

Figure 2:
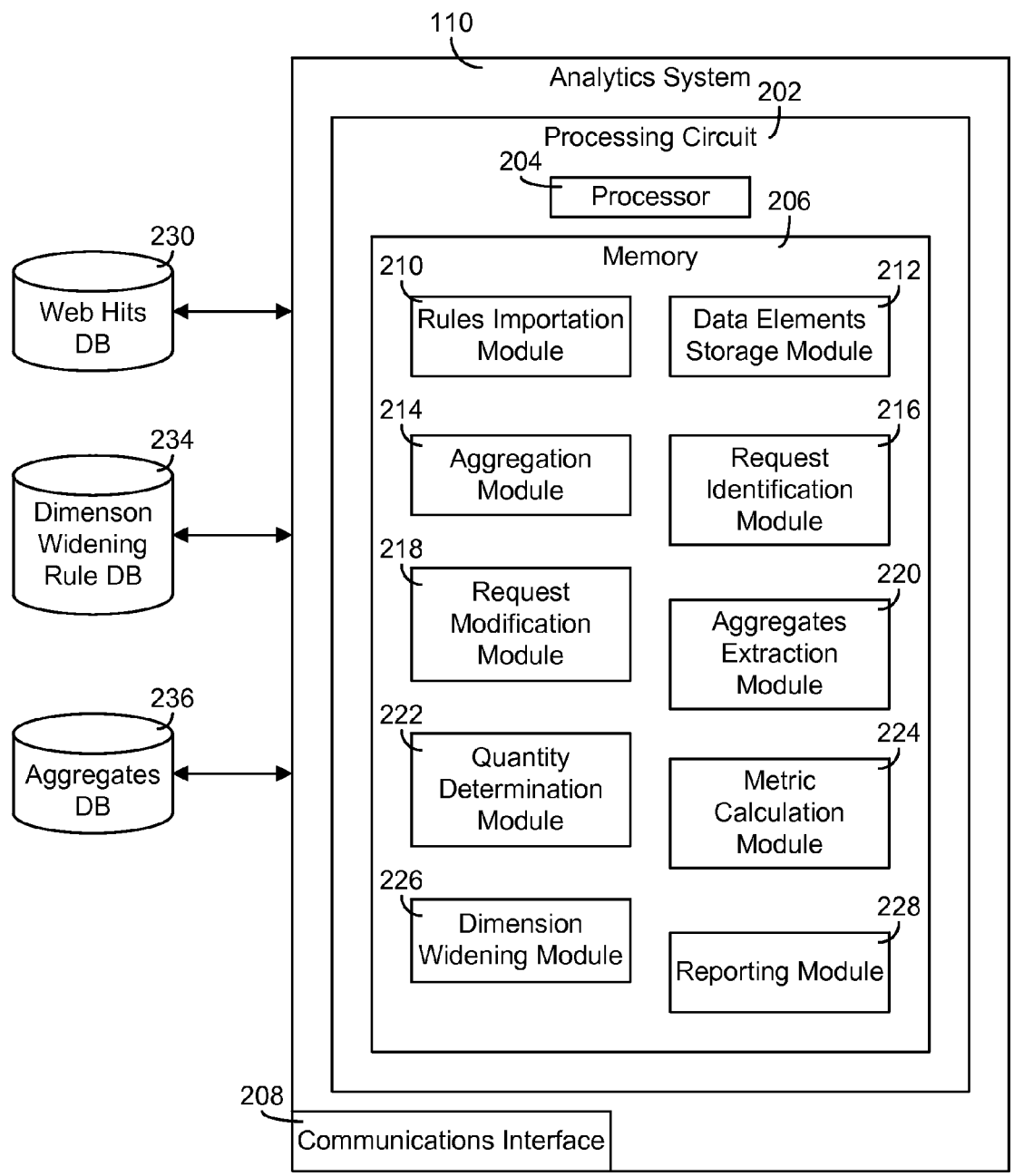
FIG. 2 is a block diagram illustrating the analytics system of FIG. 1 in greater detail, according to a described implementation.

Referring to FIG. 2, a more detailed block diagram of analytics system 110 is shown, according to a described implementation. Analytics system 110 may generally be configured to receive a set of data elements and to process the data elements by applying dimension widening rules to the data elements. The data elements may be descriptive of a content item displayed for a user of a client device 104. Analytics system 110 may use the processed data to generate requested reports.

In some implementations, the reports may be requested by a content provider to view and analyze metrics relating to one or more content items. For example, the content provider may have a campaign that presents content items to users on a website, and the report may provide information relating to the performance of the content (e.g., the number of views of the content item, the interaction between a user and the content item, etc.). In the description of the present disclosure, reports are described as being provided to users, who may be customers who are associated with one or more content items being included in the report. It should be understood that any type of user (e.g., a user associated with a content provider, a third-party catalog service not associated with the content items in the port) may provide dimension widening rules and request and receive reports from analytics system 110.

Analytics system 110 may generally receive a set of data elements from one or more of user devices 104, content providers 106, resources 108, or another source. The set of data elements may relate to a content item, according to a described implementation. For example, a data element may relate to a particular advertisement displayed on a user device. The data element may include one or more dimensions. Dimensions may identify a particular content item or describe one or more metrics relating to the performance of the content item. For example, a dimension may specify a unique ID associated with a particular content item. Another dimension may indicate a time at which the content item was distributed. A third dimension may describe an attribute of the content item (e.g., hyperlink URL, display size, etc.).

In other implementations, the data elements may relate to physical products or services. For example, a data element may describe attributes of a particular product (e.g., serial number, model number, color, price, etc.) exchanged between users. Analytics system 110 may be used to evaluate business performance by reporting sales trends, revenue, profitability, inventory, or other metrics relevant to physical products and/or services.

Analytics system 110 may store non-aggregated data elements in web hits database 230. Analytics system 110 may periodically aggregate the data elements in web hits database 230 and store the aggregated data elements in aggregates database 236.

Analytics system 110 may further receive a set of dimension widening rules as described below. The dimension widening rules may be generally used to expand a data element by introducing additional fields to the data elements. For example, if a data element includes a "product ID" attribute, the dimension widening rules may be used to add additional attributes to the data element based on the product ID. The dimension widening rules may define a mapping between product ID and other dimensions/attributes (e.g., color, price, model number, etc.). The dimension widening rules may be provided by a customer (e.g., a content provider, a distributor, a retailer, etc.) or otherwise. In some implementations, the dimension widening rules may be imported from third-party sources (e.g., product catalogs) rather than or in addition to the customer. Analytics system 110 may store the dimension widening rules in dimension widening rules database 234.

Analytics system 110 may identify a key-to-value dimension widening rule that applies to an aggregated data element stored in aggregates database 236 and extract a non-aggregated value dimension from the key-to-value dimension widening rule.

Analytics system 110 may determine a quantity of non-aggregated data elements that combined to form the aggregated data element. In some implementations, analytics system 110 adds a quantity value dimension to each non-aggregated data element in web hits database 230 prior to aggregating the data (e.g., quantity=1). Once the data are aggregated and stored in aggregates database 236, the quantity dimension value may represent the quantity of non-aggregated data elements that combined to form the aggregated data element. In other implementations, analytics system 110 generates metadata indicating the quantity of non-aggregated data elements that are combined to form the aggregated data element upon aggregating the data and stores the generated metadata in conjunction with the aggregate data in aggregates database 236.

Analytics system 110 may calculate a widened value dimension for the aggregated data element using the determined quantity (i.e., the quantity of non-aggregated data elements that combined to form the aggregated data element) and the non-aggregated value dimension extracted from the key-to-value dimension widening rule. In some implementations, analytics system 110 multiplies the determined quantity by the non-aggregated value dimension to calculate the widened dimension value. The widened dimension value may be reported to the client device in response to the request from the client device.

Still referring to FIG. 2, analytics system 110 is shown to include a communications interface 208 and a processing circuit 202. Communications interface 208 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 208 may allow analytics system 110 to communicate with network 102, client devices 104, content providers 106, and resources 108.

Processing circuit 202 is shown to include a processor 204 and memory 206. Processor 204 may be implemented as a general purpose processor, an application specific integrated circuit (ASIC), one or more field programmable gate arrays (FPGAs), a CPU, a GPU, a group of processing components, or other suitable electronic processing components.

Memory 206 may include one or more devices (e.g., RAM, ROM, Flash® memory, hard disk storage, etc.) for storing data and/or computer code for completing and/or facilitating the various processes, layers, and modules described in the present disclosure. Memory 206 may include volatile memory or non-volatile memory. Memory 206 may include database components, object code components, script components, or any other type of information structure for supporting the various activities and information structures described in the present disclosure. In some implementations, memory 206 is communicably connected to processor 204 via processing circuit 202 and includes computer code (e.g., data modules stored in memory 206) for executing one or more processes described herein. In brief overview, memory 206 is shown to include a rules importation module 210, a data elements storage module 212, an aggregation module 214, a request identification module 216, a request modification module 218, an aggregates extraction module 220, a quantity determination module 222, a metric calculation module 224, a dimension widening module 226, and a reporting module 228.

Still referring to FIG. 2, and in greater detail, memory 206 is shown to include a rules importation module 210. Rules importation module 210 is configured to receive an input relating to dimension widening rules from a user (e.g., a content provider, a third-party catalog service, etc.) and to store in the input in a dimension widening rule database 234. For example, a user may provide dimension widening rules relating to one or more data elements associated with the content provider. As another example, a third-party catalog service (e.g., independent of a customer) may provide dimension widening rules that are not explicitly given by customers (e.g., mapping from a product SKU to product_name, price, etc.).

A user may define dimension widening rules for reports received by the user. The dimension widening rules may generally be used to determine whether a dimension of a data element matches a certain criteria (e.g., a "rule condition"). If so, additional dimensions (e.g., additional properties, additional attributes, etc.) may be added to the data element. For example, a data element may include a dimension "product_code." The dimension widening rules may be applied to the data element to add the dimension "product_ name" or "price" to the data element. The dimension widening rules may support the addition of standard dimensions (e.g., dimensions supported by analytics system 110) or custom dimensions specified by a user.

The dimension widening rules generally include one or more condition dimensions and action dimensions. The condition dimensions indicate dimensions of the data element which, if satisfied by a rule condition, qualify the data element for dimension widening. For example, a rule condition may identify data elements having a "product_code" satisfying a condition value. Condition values may be numerical (e.g., product_code=1, etc.), alphanumeric, or other values potentially included in a condition dimension.

Action dimensions indicate one or more changes to a dimension, or the addition of one or more dimensions, to the data element (e.g., adding the dimension "product_name," changing the "product_code," etc.) if the rule conditions for a given rule are satisfied. It may be possible for a dimension in the dimension widening rules to be both a condition dimension and an action dimension. For example, a rule may specify that if the "product_code" is ABC, then the "product_code" should be set to XYZ. In this example "product_code" is both a condition dimension and action dimension.

A user may import the rules to rules importation module 210 in any type of method. In one implementation, analytics system 110 may provide a user interface on a client device allowing a user to enter dimension widening rules in any format. In another implementation, the dimension widening rules may be imported through an application programming interface (API). In some implementations, the user may upload a file (e.g., a comma-separated values (CSV) file) containing the dimension widening rules. The dimension widening rules in the CSV file may be formatted such that the first row is the schema of the file and subsequent rows are dimension widening rules.

Rules importation module 210 interprets the input from the user and stores the input in a standard format in dimension widening rule database 234. An example table entry of dimension widening rule database 234 is shown below:

```
schema { mapping_schema {
    conditions { name: "product_code" }
    action_dimensions { name: "product_name" }
    action_metrics { name: "product_revenue" }
    action_metrics { name: "custom_metric" index: 1 }
}}
rules { mapping_rule {
    conditions: "1" //product_code
    dimension_actions: "shoe" //product_name
    metric_actions: 5 //product_revenue
    metric_actions: 10 //cm_1
}}
rules { mapping_rule {
    conditions: "2"
    dimension_actions: "bag"
    metric_actions: 500
    metric_actions: 1000
}}
```

The first line of the table defines the mapping schema of the dimension widening rule. The mapping schema defines the names of the conditions and dimensions to which the subsequent dimension widening rules apply. For example, the mapping schema above provides that if the "product_code" satisfies some condition, action should be taken with respect to the dimension "product_name" and the metrics "product_revenue" and "custom_metric." The other rows of the table define the dimension widening rules. For example, the first rule indicates that if the "product_code" of a data element is 1, then the "product_name" dimension should be set to "shoe," the "product_revenue" dimension should be set to 5, and the "custom_metric" dimension should be set to 10.

In one implementation, rules importation module 210 may be configured to sort the dimension widening rules. For example, rules importation module 210 may generate a signature for each dimension widening rule. The signature may be computed based on values of the condition dimensions of the dimension widening rules. The signature may be stored with the rules in dimension widening rule database 234. Other modules (e.g., dimension widening module 214) may then retrieve one or more dimension widening rules from database 234 (e.g., using a binary search on the signatures of each rule). In one implementation, dimension widening rules may be sorted based on a concatenation of an account ID of the user, a log number, a data source ID, or any other identifier associated with a content item, group of content items, one or more users, or one or more content providers.

In one implementation, rules importation module 210 may be configured to allow a user to define a partial key as a condition dimension for the dimension widening rules. For example, a user may define a regular expression to extract a partial key from a data element and to use the partial key as a condition dimension for the dimension widening rules. In other words, for any data element dimension including a character string, the dimension widening rules may include a partial match condition specifying a sequence of characters. The partial match condition may be satisfied if the character string includes the sequence of characters. The partial matching feature may be especially useful for URL-based condition dimensions, as users may specify one query parameter or path segment of the URL instead of specifying an entire URL. For example, the URL:

http://www.example.com/
purchase?product_code=1234&other_key=5678 can be parsed and the value of the "product_code" (e.g., 1234) may be extracted and used as a condition in the dimension widening rule.

Still referring to FIG. 2, memory 206 is shown to include a data elements storage module 212. Data elements storage module 212 is configured to receive data elements and store the data elements in web hits database 230. The data elements may be received in the same manner as the dimension widening rules (e.g., via an importation module) or using a separate data acquisition system. In some implementations, the data elements may be associated with a content item. For example, when a user device interacts with a content item (e.g., when an advertisement is displayed on a website, when a user clicks on the advertisement, when a conversion occurs after a user clicks on the advertisement, etc.), data representative of the interaction may be sent to data elements storage module 212. Data elements storage module 212 may receive the data in an ad-hoc manner. The data may be logged and then stored by data elements storage module 212.

In some implementations, data element storage module 212 stores data elements as multidimensional data. Data elements may have a plurality of dimensions or attributes including key dimensions and value dimensions. Key dimensions may be dimensions such as "product_code" or "product_name" that define various attributes of the data element. Value dimensions may be metrics such as "revenue" or "conversions" that measure a quantity associated with the data element.

One distinction between key dimensions and value dimensions is how the dimensions are treated when the data elements are aggregated. Key dimensions may remain the same when aggregated, whereas value dimensions may change based on an aggregation function defined for the value dimension. For example, a plurality of data elements each having a "product_code" key and a "revenue" value can be aggregated to generate an aggregated data element. The aggregated data element may have the same product_code key as each of the non-aggregated data elements, and an aggregated revenue value that is the sum of the non-aggregated revenue values.

In one implementation, data elements storage module 212 adds a "quantity" value dimension to each non-aggregated data elements stored in web hits database 230. Each non-aggregated data element may be assigned the same quantity value (e.g., quantity=1) by data elements storage module 212. When the data elements are subsequently aggregated, the aggregated quantity value may represent the total number of non-aggregated data elements that were combined to form the aggregated data element. For example, if n data elements that have a quantity value of quantity=1 are aggregated, the aggregated quantity value may be quantity=n (assuming the aggregation function is a summation function). The aggregated quantity value n represents the total number of data elements that were combined to form the aggregated data element.

Still referring to FIG. 2, memory 206 is shown to include an aggregation module 214. Data elements received by analytics system 110 may be stored in web hits database 230 as described above. Aggregation module 214 may periodically aggregate the data elements stored in web hits database 230 and store the aggregated data elements in aggregates database 236. Reporting module 228 may use data elements stored in one or both of web hits database 230 and aggregates database 236 for generating reports. Aggregation module 214 may aggregate the data elements prior to receiving a request for a report (e.g., prior to query time). Pre-aggregating the data elements may reduce the amount of required data storage and reduce query time processing latency.

In one implementation, data may be stored in aggregates database 236 for a specified amount of time. For example, aggregates database 236 may be backfilled with up to one year's worth of data (e.g., data elements received in the last calendar year) or with data from any other time period. The data elements may include a timestamp or other indicator relating to time-based information.

In some implementations, analytics system 110 may receive new dimension widening rules after the data elements have already been received and/or aggregated. The new dimension widening rules may apply to the data elements stored in web hits database 230, aggregates database 236, or a combination of both. Analytics system 110 may be configured to apply the new dimension widening rules to the raw data elements stored in web hits database 230 and the aggregated data elements stored in aggregates database 236. In other words, the new dimension widening rules can be applied to historical data retroactively.

In some implementations, aggregation module 214 tracks a number of non-aggregated data elements that are combined to form an aggregated data element. The number of non-aggregated data elements that are combined to form the aggregated data element may be stored in conjunction with the aggregate data in aggregates database 236 (e.g., as a value dimension of the aggregated data element, as metadata associated with the aggregate data, etc.). Aggregation module 214 may calculate the aggregated "quantity" value by summing the individual quantity values for each non-aggregated data element.

Still referring to FIG. 2, memory 206 is shown to include a request identification module 216. Request identification module 216 may be configured to receive a request from a client device for aggregate data stored in aggregates database 236. The request may be a customer request for a report based on the aggregate data. The request may specify one or more key dimensions and/or one or more value dimensions for inclusion in the report. The specified dimensions may include existing dimensions of the aggregate data or widened dimensions of the aggregate data that will be created in response to the request as part of a query-time dimension widening process. In some implementations, the request may include a dimension widening rule.

Request identification module 216 may identify a customer profile associated with the request and load a dimension widening schema for the identified profile. The dimension widening schema may be loaded from dimension widening rules database 234 or another data source. The dimension widening schema may define one or more dimensions (e.g., condition keys, action keys, action values, etc.) to which the dimension widening rules for the identified profile apply.

Request identification module 216 may use the dimension widening schema to determine whether dimension widening is necessary to generate the requested report. Request identification module 216 may determine that dimension widening is necessary in response to a determination that one of the requested dimensions for inclusion in the report matches a dimension defined in the dimension widening schema. For example, if one of the requested dimensions matches one of the action keys defined in the dimension widening schema, request identification module 216 may determine that dimension widening is necessary so that the requested key can be added to the existing aggregate data and subsequently included in the report.

In some implementations, request identification module 216 identifies a key-to-value dimension widening rule that applies to an aggregated data element of the requested data. A key-to-value dimension widening rule may define a condition key (e.g., product_id=ABC123) and an action value (e.g., price=$4.00) to be added or modified for data elements that have the defined condition key. The action value of the key-to-value dimension widening rule may specify a non-aggregated value dimension. For example, the value dimension "price=$4.00" specifies the price of each product with the condition key "product_id=ABC123."

The non-aggregated value dimension can be directly applied to non-aggregated data elements, but cannot be directly applied to an aggregated data element. The proper value to apply to the aggregated data element is the result of aggregating multiple product_price values for all of the data elements that were aggregated to form the aggregated data element. The total number of data elements that were aggregated to form the aggregated data element may be determined by quantity determination module 222, described in greater detail below.

Still referring to FIG. 2, memory 206 is shown to include a request modification module 218. Request modification module 218 may be configured to modify the request for aggregate data using the dimension widening schema associated with the identified customer profile. The request for aggregate data may specify one or more keys that are used by aggregates extraction module 220 as scan keys for locating and retrieving the requested aggregate data from aggregates database 236. In other words, the request for aggregate data may define a list of scan keys. Request modification module 218 may add one or more keys to the list of scan keys based on the dimension widening schema associated with the request for aggregate data.

In some implementations, request modification module 218 determines whether any of the requested keys match an action key of the dimension widening schema. The action key (e.g., product_name) may not yet exist in the aggregate data because the aggregate data may not yet be dimension widened. In response to a determination that one of the requested keys matches an action key of the dimension widening schema, request modification module 218 may add the corresponding condition key (e.g., product_id) to the list of scan keys. The condition key corresponding to the action key may be defined by the dimension widening schema and/or various dimension widening rules stored in dimension widening rules database 234 (e.g., if product_id=ABC123→product_name=XYX). Adding the condition key to the list of scan keys allows data elements having the condition key to be extracted from aggregates database 236 and widened to include the requested action key using the applicable dimension widening rules.

In some implementations, request modification module 218 adds a mapping from the condition key to the action key to the original request for aggregate data (e.g., a mapping from product_id to product_name). The mapping may be defined by the dimension widening rule or schema stored in dimension widening rules database 234. Reporting module 228 may use the mapping to identify and classify the data elements included in the report.

Still referring to FIG. 2, memory 206 is shown to include an aggregates extraction module 220. Aggregates extraction module 220 may extract aggregated data elements from aggregates database 236. Aggregates extraction module 220 may use the list of scan keys generated by request identification module 216 (i.e., keys defined in the original request for aggregate data) and/or request modification module 218 (i.e., keys defined in the modified request for aggregate data) to identify and extract aggregated data elements from aggregates database 236. In some implementations, aggregates extraction module 220 scans aggregates database 220 for data elements having a key that matches one of the scan keys in the list. If a match is found, aggregates extraction module 220 may extract the identified data element.

In some implementations, aggregates extraction module 220 generates a list or table of data elements to be processed (e.g., extracted, dimension widened, etc.). The data elements in the list or table may be collocated such that data for the same customer (e.g., data relating to a particular content item or group of content items, data associated with a particular user, advertiser, business owner, etc.) are grouped together. In one implementation, aggregates extraction module 220 forms a table of data elements in which the row key is a concatenation of an account ID, log number, data source ID, or other identification that allows aggregates extraction module 220 to identify one or more data elements that match one of the scan keys.

Aggregates extraction module 220 may be configured to load a maximum number of data elements from aggregates database 236 in an attempt to fill a pre-defined memory pool (e.g., a memory device or portion thereof having a pre-defined storage capacity). The maximum number of data elements may be based on the size (i.e., storage capacity) of the memory pool. Dimension widening module 226 may perform batch lookup and join operations on the data elements in the memory pool. Such an approach may guarantee that the performance of the dimension widening process is proportional to the amount of memory available (e.g., the more memory, the faster the process).

Aggregates extraction module 220 may be configured to scan each data element in aggregates database 236 to identify data elements having a dimension associated with one or more scan keys. The data element may generally include keys or a concatenation of keys such as "account_id," "log_number," and "visitor_id" as mentioned above that identify the data element. For implementations in which the data in aggregates database 236 is collocated, consecutive data entries are likely to have similar keys and are likely to belong to the same web property. Aggregates extraction module 220 may extract data elements associated with the web property.

Still referring to FIG. 2, memory 206 is shown to include a quantity determination module 222. Quantity determination module 222 may determine a quantity of non-aggregated data elements that are represented by an aggregated data element extracted from aggregates database 236. The quantity of non-aggregated data elements that are represented by an aggregated data element may be the quantity of non-aggregated data elements that combined to form the aggregated data element.

In one implementation, quantity determination module 222 determines the quantity of non-aggregated data elements that combined to form the aggregated data element by identifying a quantity metric associated with the aggregated data element. The quantity metric may be an aggregated dimension value generated by aggregation module 214. In some implementations, each non-aggregated data element in web hits database 230 is assigned the same quantity value (e.g., quantity=1). When the data elements are subsequently aggregated, the aggregated quantity value may represent the total number of non-aggregated data elements that were combined to form the aggregated data element. For example, if n data elements that have a quantity value of quantity=1 are aggregated, the aggregated quantity value may be quantity=n (assuming the aggregation function is a summation function). The aggregated quantity value n represents the total number of data elements that were combined to form the aggregated data element.

In one implementation, quantity determination module 222 determines the quantity of non-aggregated data elements that combined to form the aggregated data element by accessing metadata associated with the aggregated data element. The number of non-aggregated data elements that are combined to form the aggregated data element may be stored as metadata in conjunction with the aggregate data in aggregates database 236. Quantity determination module 222 may calculate the quantity of non-aggregated data elements represented by the aggregated data element by summing the individual quantity values for each non-aggregated data element.

Still referring to FIG. 2, memory 206 is shown to include a metric calculation module 224. Metric calculation module 224 may calculate a widened value dimension for the aggregated data element using the quantity (Q) determined by quantity determination module 222 and the non-aggregated value dimension (V) identified by request identification module 216. The determined quantity (Q) represents the total number of non-aggregated data elements that combined to form the aggregated data element. The non-aggregated value dimension (V) represents a value dimension defined by a key-to-value dimension widening rule applicable to the aggregate data. The non-aggregated value dimension (V)

may be directly applicable to a non-aggregated data element, but not to an aggregated data element.

Metric calculation module 224 may calculate a widened value dimension (i.e., an aggregate metric) that is directly applicable to the aggregated data element to allow the key-to-value dimension widening rule to be applied to the aggregate data. In some implementations, metric calculation module 224 calculates the widened value dimension (W) by multiplying the determined quantity (Q) by the non-aggregated value dimension (V) (i.e., W=Q*V).

Still referring to FIG. 2, memory 206 is shown to include a dimension widening module 226. Dimension widening module 226 may be configured to load dimension widening rules from dimension widening rules database 234 and apply the dimension widening rules to the aggregate data extracted by aggregates extraction module 220. For implementations in which the extracted data elements are collocated, dimension widening module 226 may load the dimension widening rules once and apply the rules as a batch process to multiple data elements. In various implementations, dimension widening module 226 may apply the dimension widening rules to only aggregate data (e.g., data elements extracted from aggregates database 236) or a combination of aggregate and non-aggregate data (e.g., data elements extracted from both web hits database 230 and aggregates database 236).

In one implementation, applying the dimension widening rules to a data element may include defining a previously undefined dimension of the data element based on the dimension widening rules, and adding the dimension to the data element. For example, if the data element includes a product_code dimension and the dimension widening rules define a mapping from product_code to product_name, dimension widening module 226 may add a product_name dimension to each extracted data element with the given product_code.

Dimension widening module 226 may add the widened value dimension calculated by metric calculation module 224 to data elements that satisfy the key-to-value dimension widening rule used to calculate the widened value dimension. For example, if the key-to-value dimension widening rule defines a mapping from a condition key (e.g., product_code) to an action value (e.g., product_price), dimension widening module 226 may identify the widened value dimension (e.g., total_revenue) that was calculated using the action value. The action value may be the non-aggregated value dimension (V) used by metric calculation module 224 and the widened value dimension may be the result (W) of the calculation performed by metric calculation module 224.

In one implementation, applying the dimension widening rules to a data element may include changing a previously defined dimension of the data element based on the dimension widening rules. For example, if the data element includes a product_name dimension with a value that differs from the value specified by the dimension widening rule, the value of the product_name dimension may be changed to the new value defined by the dimension widening rules (e.g., if product_name=ABC, set product_name=XYZ).

Dimension widening module 226 may store widened aggregate data elements in aggregates database 236 and/or provide the widened aggregate data to reporting module 228. In one implementation, the dimension-widened data may be stored in temporary data storage for use in generating the requested report. After the requested report has been generated, the widened data elements may be deleted.

In other implementations, the widened data elements may be stored in aggregates database 236 along with the non-widened data elements. Dimension widening module 226 may be configured to generate a "dimension widening delta" for each processed data element. The dimension widening delta may be a second set of dimensions associated with the data element. In some implementations, the dimension widening delta may include only the dimensions added or modified by dimension widening module 226 using the dimension widening rules.

The dimension widening deltas may be stored in a new column alongside the data used to generate the dimension widening deltas. For example, dimension widening deltas generated from data stored in aggregates database 236 may be stored in a new column of database 236. The dimension widening delta for a data element may be stored separately from the other set of dimensions of the data element. By not overwriting the previous dimensions of the data elements, the raw data originally sent to analytics system 110 may be preserved. The data stored in aggregates database 236 may be subsequently accessed by reporting module 228 to generate reports.

Still referring to FIG. 2, memory 206 is shown to include a reporting module 228. Reporting module 228 may be configured to generate an analytical report using the dimension-widened aggregate data generated by dimension widening module 226. Reporting module 228 may use the widened aggregate data in conjunction with non-widened aggregate data stored in aggregates database 236 to generate a report that includes some data that required dimension widening and some data that did not require dimension widening. In some implementations, reporting module 228 uses data in web hits database 230 and aggregates database 236 to generate the report.

In some implementations, analytics system 110 performs the dimension widening process on pre-aggregated data in response to a request for a report. For example, upon receiving a request for a report from a client device, request identification module 216 may identify a dimension widening schema associated with the request (e.g., associated with a customer or account from which the request was received). Request modification module 218 may modify the request based on the identified dimension widening schema. Aggregates extraction module 220 may identify and extract data elements from aggregates database 236 that satisfy one of more of the scan keys associated with the modified request. If the dimension widening schema includes a key-to-value dimension widening rule, quantity determination module 222 and metric calculation module 224 may calculate a widened value dimension to replace the non-aggregated value dimension provided in the key-to-value dimension widening rule. Dimension widening module 226 may use the widened value dimension and/or other dimension widening rules to generate dimension-widened aggregate data.

The request to generate the report may include a plurality of identified dimensions. Reporting module 228 may be configured to select a subset of the data elements stored in web hits database 230 or aggregates database 236 by selecting data elements including each of the plurality of identified dimensions. When a user requests a report, the report generation may occur quickly, without having to aggregate non-aggregated data. The aggregate data stored in aggregates database 236 can be dimension widened using both key-to-key dimension widening rules and key-to-value dimension widening rules such that on-the-fly data aggregation is not necessary.

Analytics system 110 may be configured to support various types of dimensions and metrics as part of the dimension widening process. For example, dimensions and metrics may be webpage related (e.g., a dimension relating to a uniform resource identifier (URI), host name, or page title), campaign related (e.g., a dimension relating to a source of a content item, a medium in which the content item is presented, a content group associated with the content item, one or more keywords, a referral path, a campaign ID, a content group ID, etc.), transaction related (e.g., a dimension relating to a transaction ID, currency code, affiliation, etc.), item related (e.g., a dimension relating to a product name, code, variation, or price), browser related (e.g., a dimension relating to a browser, browser version, platform, or platform version on which a content item is displayed, a language of the content item, a screen resolution or screen colors on which the content item is displayed, if the content item is java enabled, a flash version needed to display the content item, etc.), geo data related (e.g., a dimension related to a domain or organization associated with the website), or application related (e.g., a dimension relating to an app name, version, or ID). Custom dimensions or metrics may further be supported (e.g., custom dimensions defined by a user or customer, metrics relating to performance of a content item, etc.).

Figure 3:
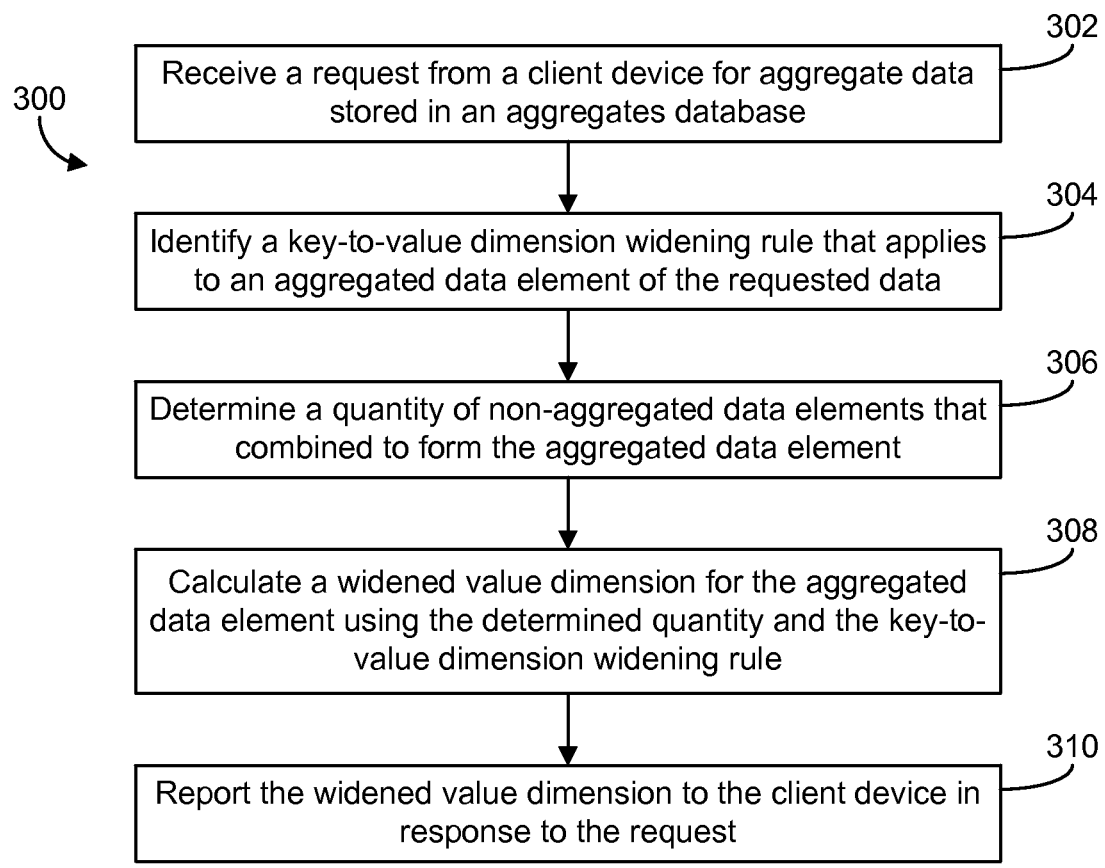
FIG. 3 is flowchart of a process for dimension widening aggregate data that may be performed by the analytics system of FIG. 1, according to a described implementation.

Referring to FIG. 3, a flow chart of a process 300 for applying dimension widening rules to aggregate data is shown, according to a described implementation. Process 300 may be performed by analytics system 110, as described with reference to FIGS. 1-2, to apply key-to-value dimension widening rules to aggregate data without requiring non-aggregated to be retained and without performing data aggregation at query time. In some implementations, process 300 is performed in response to a user query using data that has been pre-aggregated and stored in an aggregates database. Process 300 reduces processing latency by not performing data aggregation at query time and reduces data storage requirements by not requiring non-aggregated data to be retained.

Still referring to FIG. 3, process 300 is shown to include receiving a request from a client device for aggregate data stored in an aggregates database (step 302). In some implementations step 302 is performed by request identification module 216, as described with reference to FIG. 2. The request may be a customer request for a report based on the aggregate data. The request may specify one or more key dimensions and/or one or more value dimensions for inclusion in the report. The specified dimensions may include existing dimensions of the aggregate data or widened dimensions of the aggregate data that will be created in response to the request as part of process 300. In some implementations, the request may include a dimension widening rule.

Step 302 may include identifying a customer profile associated with the request and loading a dimension widening schema for the identified profile. The dimension widening schema may be loaded from dimension widening rules database 234 or another data source. The dimension widening schema may define one or more dimensions (e.g., condition keys, action keys, action values, etc.) to which the dimension widening rules for the identified profile apply.

In some implementations, step 302 includes using the dimension widening schema to determine whether dimension widening is necessary to generate the requested report. Step 302 may include determining that dimension widening is necessary in response to a determination that one of the requested dimensions for inclusion in the report matches a dimension defined in the dimension widening schema. For example, if one of the requested dimensions matches one of the action keys defined in the dimension widening schema, step 302 may include determining that dimension widening is necessary so that the requested key can be added to the existing aggregate data and subsequently included in the report.

Still referring to FIG. 3, process 300 is shown to include identifying a key-to-value dimension widening rule that applies to an aggregated data element of the requested data (step 304). The key-to-value dimension widening rule may include a non-aggregated value dimension. The key-to-value dimension widening rule may define a condition key (e.g., product_id=ABC123) and an action value (e.g., price=$4.00) to be added or modified for data elements that have the defined condition key. The action value of the key-to-value dimension widening rule may define the non-aggregated value dimension. For example, the value dimension "price=$4.00" specifies the price of each product with the condition key "product_id=ABC123."

The non-aggregated value dimension can be directly applied to non-aggregated data elements, but cannot be directly applied to an aggregated data element. The proper value to apply to the aggregated data element is the result of aggregating multiple product_price values for all of the data elements that were aggregated to form the aggregated data element. The total number of data elements that were aggregated to form the aggregated data element may be determined in step 306.

Still referring to FIG. 3, process 300 is shown to include determining a quantity of non-aggregated data elements that combined to form the aggregated data element (step 306). In some implementations, step 306 is performed by quantity determination module 222 as described with reference to FIG. 2. Step 306 may include determining a quantity of non-aggregated data elements that are represented by an aggregated data element extracted from aggregates database 236. The quantity of non-aggregated data elements that are represented by an aggregated data element may be the quantity of non-aggregated data elements that combined to form the aggregated data element.

In one implementation, step 306 includes determining the quantity of non-aggregated data elements that combined to form the aggregated data element by identifying a quantity metric associated with the aggregated data element. The quantity metric may be an aggregated dimension value generated by aggregation module 214. In some implementations, each non-aggregated data element in web hits database 230 is assigned the same quantity value (e.g., quantity=1). When the data elements are subsequently aggregated, the aggregated quantity value may represent the total number of non-aggregated data elements that were combined to form the aggregated data element. For example, if n data elements that have a quantity value of quantity=1 are aggregated, the aggregated quantity value may be quantity=n (assuming the aggregation function is a summation function). The aggregated quantity value n represents the total number of data elements that were combined to form the aggregated data element.

In one implementation, step 306 includes determining the quantity of non-aggregated data elements that combined to form the aggregated data element by accessing metadata associated with the aggregated data element. The number of non-aggregated data elements that are combined to form the aggregated data element may be stored as metadata in conjunction with the aggregate data in aggregates database 236. Step 306 may include calculating the quantity of non-aggregated data elements represented by the aggregated data element by summing the individual quantity values for each non-aggregated data element.

Still referring to FIG. 3, process 300 is shown to include calculating a widened value dimension for the aggregated data element using the determined quantity and the key-to value dimension widening rule (step 308). In some implementations, step 308 is performed by metric calculation module 224 as described with reference to FIG. 2. Step 308 may include calculating a widened value dimension for the aggregated data element using the quantity (Q) determined in step 306 and the non-aggregated value dimension (V) identified in step 304. The determined quantity (Q) represents the total number of non-aggregated data elements that combined to form the aggregated data element. The non-aggregated value dimension (V) represents a value dimension defined by a key-to-value dimension widening rule applicable to the aggregate data. The non-aggregated value dimension (V) may be directly applicable to a non-aggregated data element, but not to an aggregated data element.

In some implementations, step 308 includes calculating a widened value dimension (i.e., an aggregate metric) that is directly applicable to the aggregated data element to allow the key-to-value dimension widening rule to be applied to the aggregate data. In some implementations, step 308 includes calculating the widened value dimension (W) by multiplying the determined quantity (Q) by the non-aggregated value dimension (V) (i.e., $W=Q*V$).

Still referring to FIG. 3, process 300 is shown to include reporting the widened value dimension to the client device in response to the request (step 310). In some implementations, step 310 is performed by reporting module 228, as described with reference to FIG. 2. Step 310 may include reporting widened aggregate data that includes the widened value dimension calculated in step 308. In some implementations, step 308 includes using widened aggregate data in conjunction with non-widened aggregate data stored in aggregates database 236 to generate a report that includes some data that required dimension widening and some data that did not require dimension widening. In some implementations, step 308 includes using both non-aggregate data and aggregate data to generate the report.

Advantageously, the systems and methods of the present disclosure may be used to apply key-to-value mappings to aggregate data without requiring the non-aggregate data to be retained. This advantage allows the data to be aggregated prior to query time and stored in an aggregates database, thereby reducing both processing latency and data storage requirements. Aggregate data may be retrieved from an aggregates database in response to a request from a client device. Dimension widening rules may be applied to the aggregate data, and the dimension-widened data may be provided to the client device (e.g., in the form of a report).

In any implementation, a key-to-value dimension widening rule that applies to an aggregated data element stored in the aggregates database may be identified and a non-aggregated value dimension may be obtained from the key-to-value dimension widening rule. A quantity of non-aggregated data elements that combined to form the aggregated data element may be determined. In some implementations, a quantity value dimension is added to each non-aggregated data element prior to aggregating the data (e.g., quantity=1). Once the data are aggregated, the quantity dimension value may represent the quantity of non-aggregated data elements that combined to form the aggregated data element (e.g., quantity=n). In other implementations, metadata indicating the quantity of non-aggregated data elements that are combined to form the aggregated data element may be generated upon aggregating the data and stored in conjunction with the aggregate data.

A widened value dimension for the aggregated data element can be calculated using the determined quantity (i.e., the quantity of non-aggregated data elements that combined to form the aggregated data element) and the non-aggregated value dimension extracted from the key-to-value dimension widening rule. In some implementations, the widened value dimension is calculated by multiplying the determined quantity by the non-aggregated value dimension. The widened dimension value may be reported to the client device in response to the request from the client device.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any computer-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising computer-readable media for carrying or having computer-executable instructions or data structures stored thereon. Such computer-readable media can be any available media that can be accessed by a general purpose or special purpose computer or other machine with a processor. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. In some implementations, computer-readable media include only non-transitory media (e.g., excluding propagating signals). Combinations of the above are also included within the scope of computer-readable media. Computer-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for applying dimension widening rules to aggregate data, the method comprising:
   receiving, at a processing circuit, a request from a client device for aggregate data stored in an aggregates database;
   identifying, by the processing circuit, a key-to-value dimension widening rule that applies to an aggregated data element of the requested data, the key-to-value dimension widening rule comprising a non-aggregated value dimension;
   determining, by the processing circuit, a quantity of non-aggregated data elements that combined to form the aggregated data element;
   calculating, by the processing circuit, a widened value dimension for the aggregated data element using the determined quantity and the non-aggregated value dimension;
   reporting the widened value dimension to the client device in response to the request;
   modifying, by the processing circuit, the request for aggregate data using a dimension widening schema associated with the client device; and
   extracting the aggregated data element from the aggregates database in response to a determination that the aggregated data element satisfies the modified request.

2. The method of claim 1, wherein the key-to-value dimension widening rule comprises a condition key, the method further comprising:
   determining that the key-to-value dimension widening rule applies to the aggregated data element in response to a determination that the condition key matches a key of the aggregated data element.

3. The method of claim 1, wherein modifying the request for aggregate data comprises:
   using the dimension widening schema to identify a key-to-key dimension widening rule comprising a condition key and an action key; and
   adding the condition key to a list of scan keys for the request for aggregate data in response to a determination that the list of scan keys includes the action key.

4. The method of claim 3, wherein modifying the request for aggregate data further comprises:
   adding to the request a mapping from the condition key to the action key.

5. The method of claim 1, wherein determining whether the aggregated data element satisfies the modified request comprises:
   identifying one or more scan keys of the modified request; and
   determining whether a key of the aggregated data element matches one or more of the scan keys.

6. The method of claim 1, wherein calculating the widened value dimension for the aggregated data element comprises multiplying the non-aggregated value dimension by the determined quantity.

7. The method of claim 1, wherein determining the quantity of non-aggregated data elements that combined to form the aggregated data element comprises:
prior to aggregating the data, adding a quantity value dimension to the non-aggregated data elements; and
aggregating the quantity value dimension to calculate the quantity of non-aggregated data elements.

8. The method of claim 1, wherein determining the quantity of non-aggregated data elements that combined to form the aggregated data element comprises:
prior to aggregating the data, generating metadata comprising an indication of the quantity of non-aggregated data elements; and
storing the generated metadata in conjunction with the aggregate data.

9. An analytics system comprising:
a processing circuit having a processor and memory, the memory storing executable instructions that, when executed by the processor, configure the processing circuit to:
receive a request from a client device for aggregate data stored in an aggregates database;
identify a key-to-value dimension widening rule that applies to an aggregated data element of the requested data, the key-to-value dimension widening rule comprising a non-aggregated value dimension;
determine a quantity of non-aggregated data elements that combined to form the aggregated data element;
calculate a widened value dimension for the aggregated data element using the determined quantity and the non-aggregated value dimension;
report the widened value dimension to the client device in response to the request;
modify the request for aggregate data using a dimension widening schema associated with the client device; and
extract the aggregated data element from the aggregates database in response to a determination that the aggregated data element satisfies the modified request.

10. The analytics system of claim 9, wherein the key-to-value dimension widening rule comprises a condition key;
wherein the processing circuit is configured to determine that the key-to-value dimension widening rule applies to the aggregated data element in response to a determination that the condition key matches a key of the aggregated data element.

11. The analytics system of claim 9, wherein modifying the request for aggregate data comprises:
using the dimension widening schema to identify a key-to-key dimension widening rule comprising a condition key and an action key; and
adding the condition key to a list of scan keys for the request for aggregate data in response to a determination that the list of scan keys includes the action key.

12. The analytics system of claim 11, wherein modifying the request for aggregate data further comprises:
adding to the request a mapping from the condition key to the action key.

13. The analytics system of claim 9, wherein determining whether the aggregated data element satisfies the modified request comprises:
identifying one or more scan keys of the modified request; and
determining whether a key of the aggregated data element matches one or more of the scan keys.

14. The analytics system of claim 9, wherein calculating the widened value dimension for the aggregated data element comprises multiplying the non-aggregated value dimension by the determined quantity.

15. The analytics system of claim 9, wherein determining the quantity of non-aggregated data elements that combined to form the aggregated data element comprises:
prior to aggregating the data, adding a quantity value dimension to the non-aggregated data elements; and
aggregating the quantity value dimension to calculate the quantity of non-aggregated data elements.

16. The analytics system of claim 9, wherein determining the quantity of non-aggregated data elements that combined to form the aggregated data element comprises:
prior to aggregating the data, generating metadata comprising an indication of the quantity of non-aggregated data elements; and
storing the generated metadata in conjunction with the aggregate data.

17. A method for applying dimension widening rules to aggregate data, the method comprising:
receiving, at a processing circuit, a request from a client device for aggregate data corresponding to an aggregated data element using data stored in an aggregates database;
determining, based on the request, that the aggregate data is to be determined as a widened value dimension using a dimension widening schema defining dimensions of the aggregate data element to which dimension widening rules apply;
identifying, by the processing circuit, responsive to the determination, a key-to-value dimension widening rule using the dimension widening schema that is used to determine the requested aggregated data, the key-to-value dimension widening rule comprising a non-aggregated value dimension and mapping the non-aggregated value dimension to the widened value dimension;
determining, by the processing circuit, a quantity of non-aggregated data elements that combine to form the aggregated data element;
calculating, by the processing circuit, the widened value dimension using the determined quantity and the non-aggregated value dimension; and
reporting the widened value dimension as the requested aggregate data to the client device in response to the request.

18. The method of claim 17, wherein the key-to-value dimension widening rule comprises a condition key, the method further comprising:
determining that the key-to-value dimension widening rule applies to the aggregated data element in response to a determination that the condition key matches a key of the aggregated data element.

19. The method of claim 17, wherein determining the quantity of non-aggregated data elements that combined to form the aggregated data element comprises:
prior to aggregating the data, adding a quantity value dimension to the non-aggregated data elements; and
aggregating the quantity value dimension to calculate the quantity of non-aggregated data elements.

20. The method of claim 17, wherein calculating the widened value dimension for the aggregated data element comprises multiplying the non-aggregated value dimension by the determined quantity.

* * * * *